(12) United States Patent
Mortman

(10) Patent No.: US 10,389,754 B2
(45) Date of Patent: Aug. 20, 2019

(54) GOVERNANCE POLICY FRAMEWORK FOR CLOUD RESOURCES

(71) Applicant: QUEST SOFTWARE INC., Aliso Viejo, CA (US)

(72) Inventor: David Mortman, Worthington, OH (US)

(73) Assignee: Quest Software, Aliso Viejo, CA (US)

( * ) Notice: Subject to any disclaimer, the term of this patent is extended or adjusted under 35 U.S.C. 154(b) by 36 days.

(21) Appl. No.: 14/845,756

(22) Filed: Sep. 4, 2015

(65) Prior Publication Data

US 2017/0070536 A1  Mar. 9, 2017

(51) Int. Cl.
*H04L 29/06* (2006.01)
*G06F 21/00* (2013.01)
*H04L 12/24* (2006.01)

(52) U.S. Cl.
CPC .............. *H04L 63/20* (2013.01); *H04L 41/00* (2013.01)

(58) Field of Classification Search
CPC ........ H04L 63/20; H04L 63/10; H04L 63/102
USPC ............................................................ 726/1
See application file for complete search history.

(56) References Cited

U.S. PATENT DOCUMENTS

| | | | |
|---|---|---|---|
| 2008/0215509 A1* | 9/2008 | Charlton ............... | G06F 21/604 706/11 |
| 2012/0185913 A1* | 7/2012 | Martinez ................. | G06F 9/455 726/1 |
| 2012/0216242 A1* | 8/2012 | Uner et al. .............. | G06F 17/00 726/1 |

* cited by examiner

*Primary Examiner* — Alexander Lagor
(74) *Attorney, Agent, or Firm* — Maschoff Brennan

(57) ABSTRACT

A system, method, and computer-readable medium are disclosed for performing a cloud environment governance policy operation which provides a governance policy framework for use within cloud environments. In various embodiments, the cloud environment governance policy operation expands identify access management (IAM) systems to understand not only users but also resources. Additionally, in various embodiments, the cloud environment governance policy operation provides governance packs to abstract cloud resources and compliance/governance/regulatory regimes via a common open language.

15 Claims, 8 Drawing Sheets createPolicy() – create the initial policy. This is similar to creating an ACL in DCM.
editPolicy() – edit an existing policy
deletePolicy() – delete a policy
copyPolicy() – duplicate the policy createPack() – create the initial governance pack. Packs are collections of policies
editPack() – edit a pack
deletePack() – delete a pack
copyPack() – duplicate a pack
addPolicyToPack() – add a policy to a governance pack (subset of editPack?)
applyPack() – apply a pack to a resource or deployment

*Figure 4*

```
createPolicy() - create the initial policy. This is similar to creating an ACL in
DCM.

POST (JSON)
    POST /api/enstratus/2014-06-01/policy/Policy HTTP/1.1
    User-agent: Policy Test Case
    Accept: application/json
    x-esauth-access: XIJZOCUMPNYYZJHOSXYU
    x-esauth-signature: uRY3yeuTZ6AY/sPQbYG7v2pPdfuSoB5zEo9dgN+fklw=
    x-esauth-timestamp: 1323997301511
    x-es-details: basic
    x-es-with-perms: false {"create":
        [
            {
                "name":"New Policy 8675309",
                "servers":[
                    {"webservers" , "loadbalancers" }
                ],
                "requires":"enableSSL"
            }
        ]
    }

POST (XML)
    POST /api/enstratus/2014-06-01/policy/Policy HTTP/1.1
    User-agent: Policy Test Case
    Accept: application/xml
    x-esauth-access: XIJZOCUMPNYYZJHOSXYU
    x-esauth-signature: IcyiYBe9FGMgC8b8v6mOwpJv88x597Tvpr9V89Y+aVE=
    x-esauth-timestamp: 1323997809565
    x-es-details: basic
    x-es-with-perms: false
    <create>
       <policy>
          <name>New Policy 8675309</name>
          <servers>
             <server>servercode="webserver" </server>
             <server>servercode="loadbalancers" </server>
          </servers>
          <requires>"enableSSL"</requires>
       </policy>
    </create>
```

*Figure 5*

```
editPolicy() - edit an existing policy
PUT (JSON)
    PUT /api/enstratus/2014-06-01/policy/Policy/1234 HTTP/1.1
    User-agent: Policy Test Case
    Accept: application/json
    x-esauth-access: XIJZOCUMPNYYZJHOSXYU
    x-esauth-signature: uRY3yeuTZ6AY/sPQbYG7v2pPdfu5oB5zEo9dgN+fklw=
    x-esauth-timestamp: 1323997301511
    x-es-details: basic
    x-es-with-perms: false {"edit":
        [
            {
                "name":"New Policy 8675319"
            }
        ]
    }

PUT (XML)
    PUT /api/enstratus/2014-06-01/policy/Policy/1234 HTTP/1.1
    User-agent: Policy Test Case
    Accept: application/xml
    x-esauth-access: XIJZOCUMPNYYZJHOSXYU
    x-esauth-signature: IcyiYBe9FGMgC8b8v6mOwpJVB8xS97Tvpr9VB9Y+aVE=
    x-esauth-timestamp: 1323997809565
    x-es-details: basic
    x-es-with-perms: false
    <edit>
        <policy>
            <name>New Policy 8675319</name>
        </policy>
    </edit>
```

*Figure 6*

```
deletePolicy() - delete a policy

DELETE
    DELETE /api/enstratus/2014-06-01/policy/Policy/1234?reason=test+policy
HTTP/1.1
    User-agent: Policy Test Case
    Accept: application/json
    x-esauth-access: XIJZOCUMPNYYZJHOSXYU
    x-esauth-signature: OrrmSmNY2oUgay2smH6mlNu8CFOQQApbfJ4oS6PY3GA=
    x-esauth-timestamp: 1323999202300
    x-es-details: basic
    x-es-with-perms: false
```

*Figure 7*

```
createPack() - create the initial governance pack. Packs are collections of policies
POST (JSON)
        POST /api/enstratus/2014-06-01/policy/Pack HTTP/1.1
        User-agent: Pack Test Case
        Accept: application/json
        x-esauth-access: XIJZOCUMPNYYZJHOSXYU
        x-esauth-signature: uRY3yeuTZ6AY/sPQbYG7v2pPdfuSoB5zEo9dgN+fklw=
        x-esauth-timestamp: 1323997301511
        x-es-details: basic
        x-es-with-perms: false {"create":
            [
                {
                    "name":"New Pack 8675309"
                }
            ]
        }

POST (XML)
        POST /api/enstratus/2014-06-01/policy/Pack HTTP/1.1
        User-agent: Pack Test Case
        Accept: application/xml
        x-esauth-access: XIJZOCUMPNYYZJHOSXYU
        x-esauth-signature: IcyiYBe9FGMgC8b8v6mOWpJVB8xS97Tvpr9VB9Y+aVE=
        x-esauth-timestamp: 1323997809565
        x-es-details: basic
        x-es-with-perms: false
        <create>
          <pack>
            <name>New Pack 8675309</name>
          </pack>
        </create>
```

*Figure 8*

```
editPack() - edit a policy

PUT (JSON)
    PUT /api/enstratus/2014-06-01/policy/Pack/4321 HTTP/1.1
    User-agent: Pack Test Case
    Accept: application/json
    x-esauth-access: XIJZOCUMPNYYZJHOSXYU
    x-esauth-signature: uRY3yeuTZ6AY/sPQbYG7v2pPdfuSoB5zEo9dgN+fklw=
    x-esauth-timestamp: 1323997301511
    x-es-details: basic
    x-es-with-perms: false {"create":
        [
            {
                "name":"New Pack 8675319"
            }
        ]
    }

PUT (XML)
    PUT /api/enstratus/2014-06-01/policy/Pack/4321 HTTP/1.1
    User-agent: Pack Test Case
    Accept: application/xml
    x-esauth-access: XIJZOCUMPNYYZJHOSXYU
    x-esauth-signature: IcyiYBe9FGMgC8b8v6mOwpJVB8xS97Tvpr9VB9Y+aVE=
    x-esauth-timestamp: 1323997809565
    x-es-details: basic
    x-es-with-perms: false
    <create>
      <pack>
        <name>New Pack 8675319</name>
      </pack>
    </create>
```

*Figure 9*

```
deletePack() - delete a policy

DELETE
        DELETE /api/enstratus/2014-06-01/policy/Pack/4321?reason=test+policy HTTP/1.1
        User-agent: Pack Test Case
        Accept: application/json
        x-esauth-access: XIJZOCUMPNYYZJHOSXYU
        x-esauth-signature: OrrmSmNY2oUgay2smH6mlNu8CFQQQApbfJ4oS6PY3GA=
        x-esauth-timestamp: 1323999202300
        x-es-details: basic
        x-es-with-perms: false
```

*Figure 10*

```
addPolicyToPack() - add a policy to a governance pack (subset of editPack?)

PUT (JSON)
        PUT /api/enstratus/2014-06-01/policy/Pack/4321 HTTP/1.1
        User-agent: Pack Test Case
        Accept: application/json
        x-esauth-access: XIJZOCUMPNYYZJHOSXYU
        x-esauth-signature: uRY3yeuTZ6AY/sPQbYG7v2pPdfuSoB5zEo9dgN+fklw=
        x-esauth-timestamp: 1323997301511
        x-es-details: basic
        x-es-with-perms: false {"addPolicy":
            [
                {
                    "policy":"1234"
                }
            ]
        }

PUT (XML)
        PUT /api/enstratus/2014-06-01/policy/Pack/4321 HTTP/1.1
        User-agent: Pack Test Case
        Accept: application/xml
        x-esauth-access: XIJZOCUMPNYYZJHOSXYU
        x-esauth-signature: IcyiYBe9FGMgC8b8v6mOWpJVB8xS97Tvpr9VB9Y+aVE=
        x-esauth-timestamp: 1323997809565
        x-es-details: basic
        x-es-with-perms: false
        <edit>
          <pack>
            <policy>1234</name>
          </pack>
        </edit>
```

*Figure 11*

GOVERNANCE POLICY FRAMEWORK FOR CLOUD RESOURCES

BACKGROUND OF THE INVENTION

Field of the Invention

The present invention relates to information handling systems. More specifically, embodiments of the invention relate to providing a governance policy framework for use with cloud resources.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems within cloud computing environments. Cloud computing environments offer a flexible, cost-effective, and dependable delivery platform for providing information technology (IT) services over the Internet. In particular, these cloud computing environments allow resources to be rapidly deployed and easily scaled. Likewise, a broad variety of processes, applications, and services can be provisioned on demand, regardless of the user location or device. As a result, cloud computing environments give organizations the opportunity to increase their service delivery efficiencies, streamline IT management, and better align IT services with dynamic business requirements.

Many IT customers wish to use cloud computing environments and especially public cloud computing environments for managing all of their business IT needs. However, dealing with compliance and governance issues can be a very difficult situation. Similarly, customers wishing to use cloud computing environments often need more control over their data and many known role based access control (RBAC) techniques and/or attribute based access control (ABAC) techniques are not sufficient. Furthermore, customers wishing to use cloud computing environments often want to enable their users to do their work in a compliant fashion with minimal effort by the user.

Furthermore, customers want clouds to be ready for compliance/regulatory related workloads and compliance of the cloud provider is necessary but not sufficient. Manual management is neither scalable nor consistent. This problem gets worse when trying to normalize against multiple clouds or cloud accounts.

SUMMARY OF THE INVENTION

A system, method, and computer-readable medium are disclosed for performing a cloud environment governance policy operation which provides a governance policy framework for use within cloud environments. In various embodiments, the cloud environment governance policy operation expands identify access management (IAM) systems to understand not only users but also resources. Additionally, in various embodiments, the cloud environment governance policy operation provides governance packs to abstract cloud resources and compliance/governance/regulatory regimes via a common open language.

By abstracting the cloud resources, customers are able to easily define their needs or leverage IT provider provided governance packs. As a result, policies and configuration management options are automated and users no longer need to worry about a range of security/compliance/governance requirements such as disk encryption, SSL being enabled, regional or cloud restrictions etc.

Such a cloud environment governance policy operation normalizes policy and governance across multiple clouds and products, provides consistent governance and policy rules regardless of the underlying infrastructure and reduces any need for users to understand governance, regulatory and/or legislative rules.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows an example list of policy calls.

FIG. 5 shows an example of the application program interface calls for a create policy call.

FIG. 6 shows an example of the application program interface calls for an edit policy call.

FIG. 7 shows an example of the application program interface calls for a delete policy call.

FIG. 8 shows an example of the application program interface calls for a create pack call.

FIG. 9 shows an example of the application program interface calls for an edit pack call.

FIG. 10 shows an example of the application program interface calls for a delete pack call.

FIG. 11 shows an example of the application program interface calls for an add policy to pack call.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
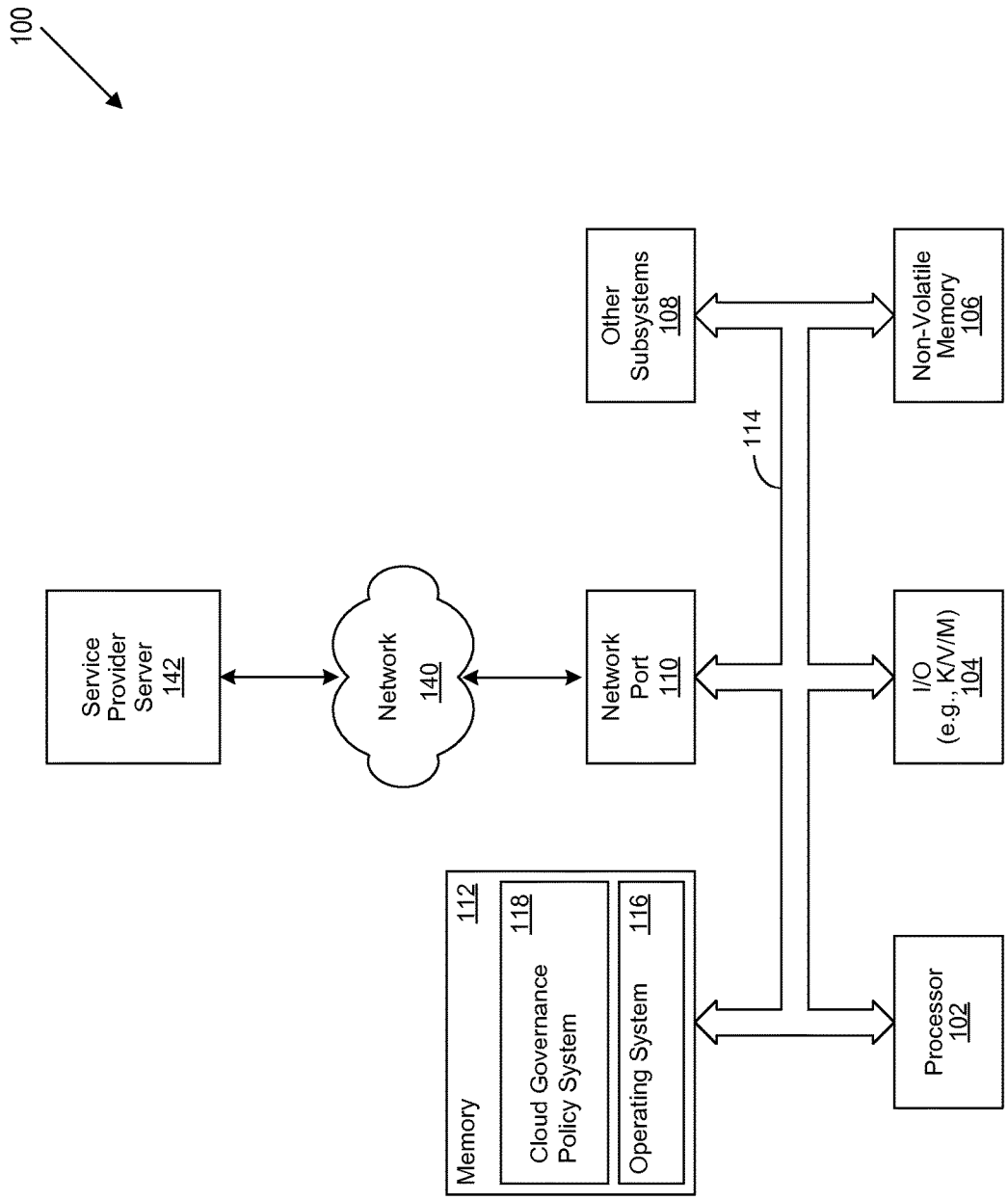
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a cloud environment governance policy system 118.

The cloud environment governance policy system 118 performs a cloud environment governance policy operation which provides a governance policy framework for use within cloud environments. In various embodiments, the cloud environment governance policy operation expands identify access management (IAM) systems to understand not only users but also resources. Additionally, in various embodiments, the cloud environment governance policy operation provides governance packs to abstract cloud resources and compliance/governance/regulatory regimes via a common open language.

By abstracting the cloud resources, customers are able to easily define their needs or leverage IT provider provided governance packs. As a result, policies and configuration management options are automated and users no longer need to worry about a range of security/compliance/governance requirements such as disk encryption, SSL being enabled, regional or cloud restrictions etc.

Such a cloud environment governance policy operation normalizes policy and governance across multiple clouds and products, provides consistent governance and policy rules regardless of the underlying infrastructure and reduces any need for users to understand governance, regulatory and/or legislative rules.

Figure 2:
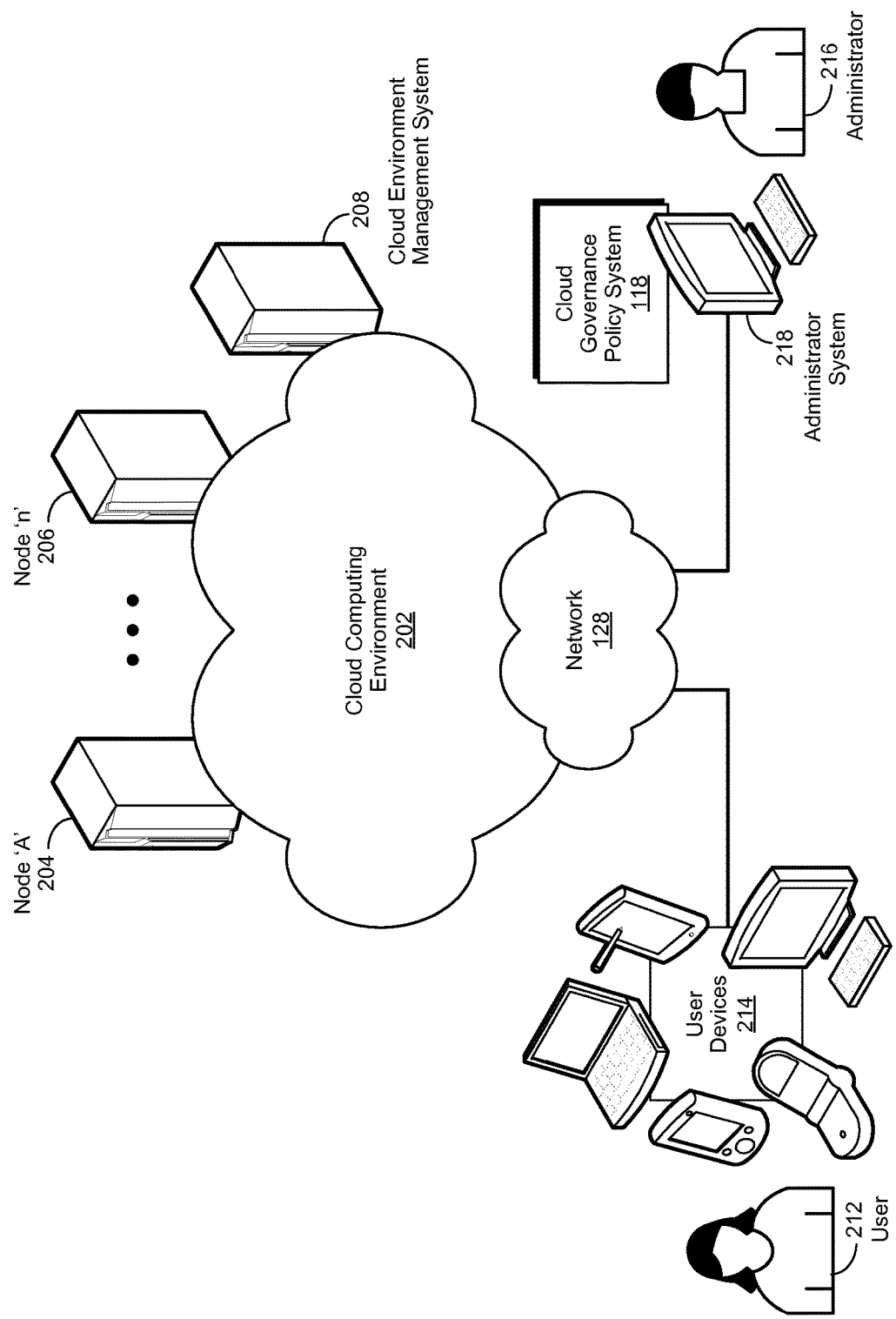
FIG. 2 shows a generalized block diagram of a cloud computing environment.

FIG. 2 is a generalized block diagram of a cloud computing environment implemented in accordance with an embodiment of the invention. In various embodiments, the cloud computing environment 202, also referred to herein as a cloud environment 202, is accessed through a network 128. In certain embodiments, the network 128 used to access the cloud computing environment 202 may be the Internet, an intranet, or a hybrid of the two. As shown in FIG. 2, the cloud computing environment 202 may include a plurality of nodes, such as node 'A' 204 through 'n' 206, which are accessed by a user 212 through the use of one or more user devices 214. In various embodiments, nodes 'A' 204 through 'n' 206 are based upon a common image and are homogeneous in their configuration. In certain embodiments, nodes 'A' 204 through 'n' 206 are managed by a cloud environment management system 208, which in turn is managed by an administrator 216 through the use of an associated administrator system 218. In various embodiments, the administrator system 218 is implemented with a cloud environment governance policy system 118 which performs a cloud environment governance policy operation which provides a governance policy framework for use within cloud environments.

As used herein, a node, such as nodes 'A' 204 through 'n' 206, broadly refers to a processing location within the cloud computing environment 202. In various embodiments, each node may generally be considered a resource to process data such as a computer or any other device configured to process data. In these embodiments, the node has a unique address. In certain embodiments, the address may be a Data Link Control (DLC) address, a Media Access Control (MAC) address, a physical address, a network address, a logical address, or some combination thereof.

Skilled practitioners of the art will be aware that the cloud computing environment 202 may be implemented in a public, private or hybrid model. Public models include Software as a Service (SaaS) clouds, Platform as a Service (PaaS) clouds, and Security and Data Protection as a Service (SDPaaS) clouds. In contrast, private clouds are owned and used by a single organization. As such, they offer many of the same benefits as public clouds, but typically give the owner organization greater flexibility and control. Furthermore, private clouds may provide lower latency than public clouds during peak traffic periods. Many organizations embrace both public and private cloud computing by integrating the two models into hybrid clouds. These hybrid cloud computing environments are designed to meet specific business and technology requirements, helping to optimize security and privacy with a minimum investment in fixed IT costs.

In various embodiments, the cloud environment governance policy system 118 is implemented to maintain predetermined governance policy aspects of each node (e.g., nodes 'A' 204 through 'n' 206) in the cloud computing environment.

Figure 3:
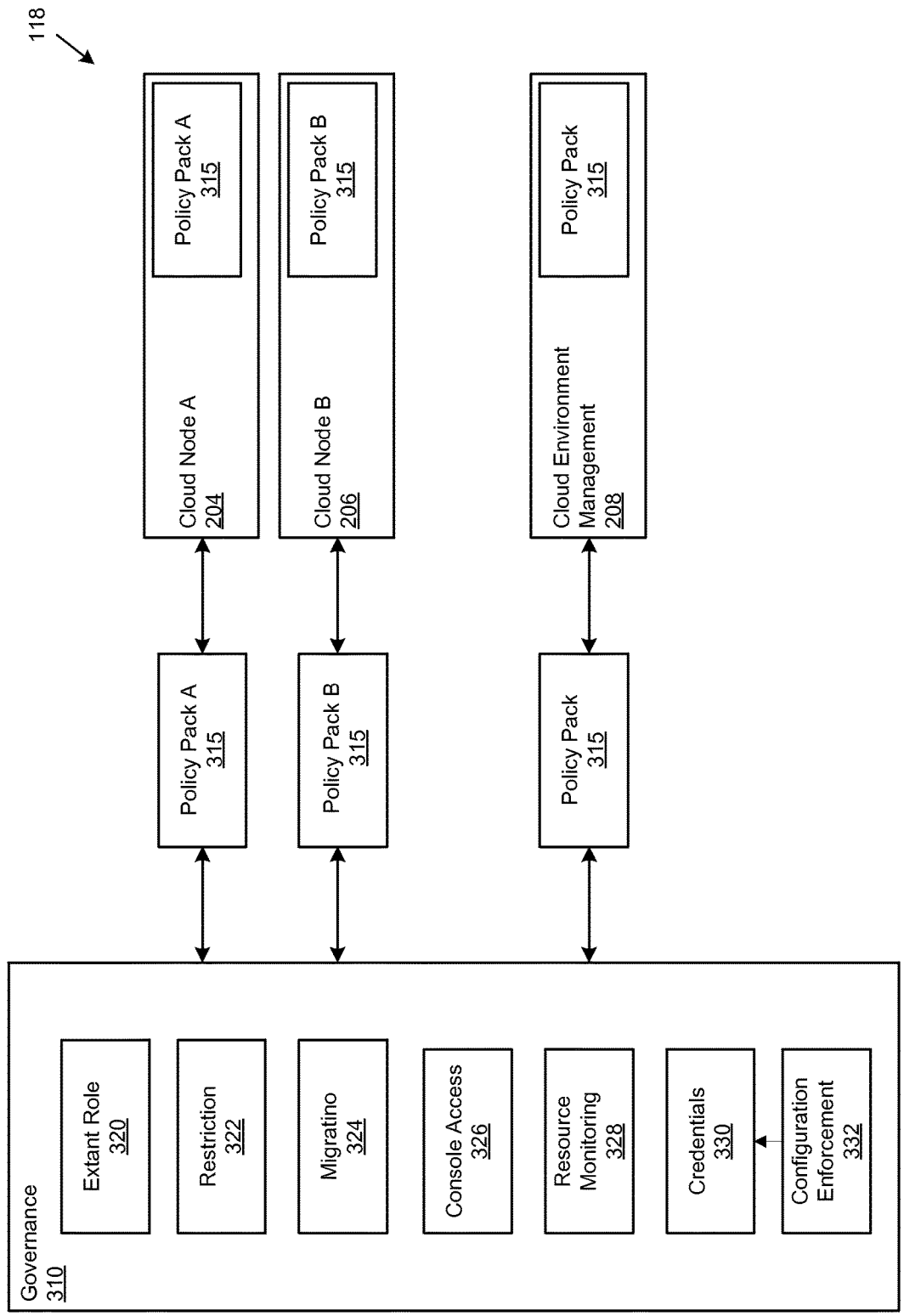
FIG. 3 shows a block diagram of the cloud environment governance policy system.

Referring to FIG. 3, a block diagram of the cloud environment governance policy system 118 is shown. More specifically, the cloud environment governance policy system 118 includes a governance portion 310. The governance portion 310 enables the cloud environment policy system 118 to perform a cloud environment governance policy operation which provides a governance policy framework for use within cloud environments. Additionally, in certain embodiments, the governance portion 310 enables the cloud environment governance policy system 118 to generate one or more governance policy packs 315 to correspond to particular governance policy frameworks. The governance policy packs 315 may be provided to cloud nodes (e.g., cloud node A 204, cloud node B 206) as well as to cloud environment management nodes (e.g., cloud environment management node 208).

The governance portion 310 includes an extant role portion 320, a restriction portion 322, a migration portion 324, a console access portion 326, a resource monitoring portion 328, a credentials portion 330 and a configuration enforcement portion 332. The extant role portion provides information and options relating to extant roles of a particular cloud system (i.e., roles of the cloud system that already exist). The restriction portion provides information and options regarding restrictions of a cloud system based upon certain regions, zones and/or clouds. The migration portion 324 provides information and options relating to whether a particular governance policy generates alerts based upon attempted migration of volumes etc. to alternate providers and/or regions. The console access portion 326 provides information and options relating to whether a particular governance policy allows cloud console access. The resource monitoring portion 328 provides information and options relating to whether a particular governance policy allows access to cloud monitoring resources. The credentials portion 330 provides information and options relating to whether a particular governance policy allows passing of credentials to third party type data repositories. The configuration enforcement portion 332 information and options relating to whether a particular governance policy allows enforcement of certain cloud resource configurations. In various embodiments, the cloud resource configurations include firewall rules, blob storage resource configuration, file system encryption configurations, key sizing configuration, backup regime configurations, whether to allow the installation of open source security (OSSEC) type or related types of devices, whether to allow communications to be routed through an application delivery network such as the F5 application delivery network, whether to enable installation of cloud management applications such as a filtering and security application (e.g., the ModSecurity server module), a load balancing application (e.g., the Haproxy load balancing solution and the Pound reverse proxy, web server load balancing application) and whether to restrict which software versions can be deployed via the cloud system.

The cloud environment governance policy system 118 enables generation of governance packs which include pre-configured cloud environment governance policy templates which are globally available to all customers. Additionally, the cloud environment governance policy system 118 enables generation of governance packs which are editable by administrators within a particular organization. Additionally, the cloud environment governance policy system 118 enables generation of governance packs which may be edited and controlled by predefined infrastructure management platform roles such as Enstratius infrastructure management platform roles. Additionally, the cloud environment governance policy system 118 enables generation of governance packs which may be different depending on the cloud system being accessed by an organization.

Examples of cloud environment governance policy template packs include a European Data Directive cloud environment governance policy template pack as well as a Health Insurance Portability and Accountability Act (HIPAA) compliance cloud environment governance policy template pack. More specifically in certain embodiments, the European Data Directive cloud environment governance policy template pack restricts deployments to only European cloud providers. The European Data Directive cloud environment governance policy template pack also enables bucket logging if used for HTTP(S) type communications. In certain embodiments, the HIPAA compliance cloud environment governance policy template pack forces file system encryption on all data volumes, forces minimum keysizes, sets up higher levels of logging/alerting of access to resources, forces SSL for all web services and stores administrative passwords for SSL and databases to conform to predefined infrastructure management platform roles such as Enstratius infrastructure management platform roles.

Referring to FIG. 4, an example list of policy calls 400 is shown. More specifically, in various embodiments, the policy calls can include some or all of a create policy call, an edit policy call, a delete policy call and a copy policy call. The policy calls can also include policy pack calls. More specifically, in various embodiments, the policy pack calls can include some or all of a create pack call, an edit pack call, a delete pack call a copy pack call, and add policy to pack call and an apply pack call.

The create policy call creates an initial policy. The edit policy call edits an existing policy. The delete policy call deletes a policy. The copy policy call duplicates a policy. The create pack call creates an initial governance pack. A governance pack includes a collection of policies. The edit pack call edits a governance pack. The delete pack call deletes a governance pack, the copy pack call duplicates a governance pack. The add policy to pack call adds a policy to a governance pack. The apply pack call applies a pack to a resource or deployment.

Referring to FIG. 5, an example of the application program interface calls for a create policy call is shown. This create policy call provides a cloud environment governance policy system 118 with an API for creating a policy.

Referring to FIG. 6, an example of the application program interface calls for an edit policy call is shown. Sometimes after a policy is created (e.g., via the create policy call), that policy needs to change. The edit policy call is an example of how a user might make that change.

Referring to FIG. 7, an example of the application program interface calls for a delete policy call is shown. When a policy needs to be removed completely from the system, the delete policy call is how a user would programmatically accomplish the removal.

Referring to FIG. 8, an example of the application program interface calls for a create pack call is shown. Once policies have been created, the policies can be grouped into packs. The create pack API call allows for the creation of the pack. In certain embodiments, a pack with no policies can be generated using the create pack call as a placeholder for future use.

Referring to FIG. 9, an example of the application program interface calls for an edit pack call is shown. Over time, packs may need to change. The edit pack API call allows these changes to happen in a consistent fashion.

Referring to FIG. 10, an example of the application program interface calls for a delete pack call is shown. Much like individual policies can be deleted, so can governance packs. The delete pack call enables happened deletion of a pack.

Referring to FIG. 11, an example of the application program interface calls for an add policy to pack call is shown. The add policy call is used to add policies to a pack. Additionally, it will be appreciated that the cloud environment governance policy system 118 may include a remove policy from pack call which is used to remove policies from a pack.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the cloud environment governance policy operation can also be used with virtual machines and/or containers as well as with physical systems. Also for example, the cloud environment governance policy operation can be retroactively applied to existing resources to provide the existing resources with a governance framework.

Also for example, the cloud environment governance policy operation can be used to perform an audit function. With an audit function, the cloud environment governance policy operation can be applied to existing systems in a passive (i.e., read only) mode to assess a state of the existing systems and thus ascertain whether or not the systems are compliant with relevant governance or regulatory requirements. Thus, the cloud environment governance policy operation can be used not only by internal teams (performing some or all of an internal security function, a governance function, an operational management function and an audit function) but also by an outside audit organization as well.

Consequently, the invention is intended to be limited only by the spirit and scope of the appended claims, giving full cognizance to equivalents in all respects.

What is claimed is:

1. A computer-implementable method, comprising:
providing, by an information handling system (IHS), a governance portion for use within a cloud environment, the governance portion enabling a cloud environment policy system to provide a set of governance policies;
providing, by a processor of the IHS, cloud resource information of the cloud environment to allow a user to define governance policy needs associated with use of the cloud environment;
generating, by the governance portion using the set of governance policies, a governance pack based upon the governance policy needs of the user, the governance pack comprising a set of pre-configured cloud environment governance policy templates that correspond to the governance policy needs of the user;
providing the governance pack to the cloud environment;
receiving an input to edit the governance pack;
modifying the governance pack according to the input to edit the governance pack to create a modified governance pack, wherein the governance pack is modified under the control of a predefined infrastructure management platform role; and
providing the modified governance pack to the cloud environment, wherein at least one cloud resource in the cloud environment is modified based on the modified governance pack.

2. The method of claim 1, wherein:
the governance pack enables an identify access management (IAM) system to understand resources.

3. The method of claim 1, wherein:
the governance pack abstracts cloud resources and at least one of a compliance regime, a governance regime and a regulatory regime via a common open language.

4. The method of claim 1, wherein:

the governance pack comprises information and options regarding at least one of an extant role, a restriction limitation, a migration alert request operation, a console access limitation, a resource monitoring access limitation, a credentials requirement limitation and a configuration enforcement limitation.

5. The method of claim 4, wherein:

the configuration enforcement limitation comprises at least one of firewall rules, blob storage resource configuration limitations, file system encryption configurations, key sizing configurations, backup regime configurations, whether to allow installation of open source security (OSSEC) type devices, whether to allow communications to be routed through an application delivery network, whether to enable installation of cloud management applications and whether to restrict which software versions can be deployed to the cloud environment.

6. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor to cause the system to perform operations comprising:

provide a governance portion for use within a cloud environment the governance portion enabling a cloud environment policy system to provide a set of governance policies;

provide cloud resource information of the cloud environment to allow a user to define governance policy needs associated with use of the cloud environment;

generate, by the governance portion using the set of governance policies, a governance pack based upon the governance policy needs of the user, the governance pack comprising a set of pre-configured cloud environment governance policy templates that correspond to the governance policy needs of the user;

provide the governance pack to the cloud environment;

receive an input to edit the governance pack;

modify the governance pack according to the input to edit the governance pack to create a modified governance pack, wherein the governance pack is modified under the control of a predefined infrastructure management platform role; and provide the modified governance pack to the cloud environment, wherein at least one cloud resource in the cloud environment is modified based on the modified governance pack.

7. The system of claim 6, wherein:

the governance pack enables an identify access management (IAM) system to understand resources.

8. The system of claim 6, wherein:

the governance pack abstracts cloud resources and at least one of a compliance regime, a governance regime and a regulatory regime via a common open language.

9. The system of claim 6, wherein:

the governance pack comprises information and options regarding at least one of an extant role, a restriction limitation, a migration alert request operation, a console access limitation, a resource monitoring access limitation, a credentials requirement limitation and a configuration enforcement limitation.

10. The system of claim 6, wherein:

the configuration enforcement limitation comprises at least one of firewall rules, blob storage resource configuration limitations, file system encryption configurations, key sizing configurations, backup regime configurations, whether to allow installation of open source security (OSSEC) type devices, whether to allow communications to be routed through an application delivery network, whether to enable installation of cloud management applications and whether to restrict which software versions can be deployed to the cloud environment.

11. A non-transitory, computer-readable storage medium embodying computer program code, the computer program code comprising computer executable instructions to cause a system to perform operations comprising configured for:

providing a governance portion for use within a cloud environment, the governance portion enabling a cloud environment policy system to provide a set of governance policies;

providing cloud resource information of the cloud environment to allow a user to define governance policy needs associated with use of the cloud environment;

generating, by the governance portion using the set of governance policies, a governance pack based upon the governance policy needs of the user, the governance pack comprising a set of pre-configured cloud environment governance policy templates that correspond to the governance policy needs of the user;

providing the governance pack to the cloud environment;

receiving an input to edit the governance pack;

modifying the governance pack according to the input to edit the governance pack to create a modified governance pack, wherein the governance pack is modified under the control of a predefined infrastructure management platform role; and providing the modified governance pack to the cloud environment, wherein at least one cloud resource in the cloud environment is modified based on the modified governance pack.

12. The non-transitory, computer-readable storage medium of claim 11, wherein:

the governance pack enables an identify access management (IAM) system to understand resources.

13. The non-transitory, computer-readable storage medium of claim 11, wherein:

the governance pack provides a governance pack to abstract cloud resources and at least one of a compliance regime, a governance regime and a regulatory regime via a common open language.

14. The non-transitory, computer-readable storage medium of claim 11, wherein:

the governance pack comprises information and options regarding at least one of an extant role, a restriction limitation, a migration alert request operation, a console access limitation, a resource monitoring access limitation, a credentials requirement limitation and a configuration enforcement limitation.

15. The non-transitory, computer-readable storage medium of claim 11, wherein:

the configuration enforcement limitation comprises at least one of firewall rules, blob storage resource configuration limitations, file system encryption configurations, key sizing configurations, backup regime configurations, whether to allow installation of open source security (OSSEC) type devices, whether to allow communications to be routed through an application delivery network, whether to enable installation of cloud management applications and whether to restrict which software versions can be deployed to the cloud environment.

* * * * *